United States Patent
Biter et al.

(10) Patent No.: US 6,899,170 B2
(45) Date of Patent: May 31, 2005

(54) ELECTROSTATIC SWITCHED RADIATOR FOR SPACE BASED THERMAL CONTROL

(76) Inventors: William J. Biter, 948 Wawset Rd., Kennett Square, PA (US) 19348; Sung J. Oh, 342 Harshaw Dr., Chester Springs, PA (US) 19425; Stephen M. Hess, 300 Baywood Rd., West Chester, PA (US) 19382

( * ) Notice: Subject to any disclaimer, the term of this patent is extended or adjusted under 35 U.S.C. 154(b) by 86 days.

(21) Appl. No.: 09/991,002

(22) Filed: Nov. 15, 2001

(65) Prior Publication Data

US 2003/0089484 A1 May 15, 2003

(51) Int. Cl.[7] .......................... F28F 27/00; F28F 13/18; F28F 13/16
(52) U.S. Cl. .......................... 165/277; 165/41; 165/96; 165/133; 165/135; 244/148 R
(58) Field of Search .............................. 165/41, 42, 46, 165/96, 133, 135, 134.1, 276, 277, 96 HV; 244/148 R

(56) References Cited

U.S. PATENT DOCUMENTS

| | | | | |
|---|---|---|---|---|
| 3,177,933 A | * | 4/1965 | Webb .................... 165/96 HV |
| 3,205,937 A | * | 9/1965 | Shyffer .................. 165/96 HV |
| 3,220,647 A | * | 11/1965 | Riordan et al. ......... 165/277 X |
| 3,244,224 A | * | 4/1966 | Hnilicka, Jr. ........... 165/276 X |
| 3,374,830 A | * | 3/1968 | O'Sullivan, Jr. ........ 165/96 HV |
| 3,519,490 A | * | 7/1970 | Lieberman ......... 165/96 HV X |
| 3,734,172 A | * | 5/1973 | Clifford ................. 165/96 HV |
| 3,763,928 A | * | 10/1973 | Fletcher et al. ..... 165/96 HV X |
| 4,085,999 A | * | 4/1978 | Chahroudi .............. 165/276 X |
| 4,273,183 A | * | 6/1981 | Altoz et al. ................. 165/277 |
| 4,281,708 A | * | 8/1981 | Wing et al. |
| 4,332,628 A | * | 6/1982 | Andoh |
| 4,337,097 A | * | 6/1982 | Tokumasu et al. |
| 4,454,910 A | * | 6/1984 | Miyazaki ..................... 165/276 |
| 4,610,771 A | * | 9/1986 | Gillery |
| 4,665,463 A | | 5/1987 | Ward et al. |
| 4,771,730 A | | 9/1988 | Tezuka |
| 5,156,087 A | * | 10/1992 | Cusson et al. .......... 165/276 X |
| 5,296,285 A | * | 3/1994 | Babel et al. |
| 5,562,154 A | * | 10/1996 | Benson et al. .......... 165/276 X |
| 5,769,159 A | * | 6/1998 | Yun ........................... 165/276 |
| 5,806,800 A | * | 9/1998 | Caplin .................... 244/158 R |
| 5,813,454 A | * | 9/1998 | Potter ......................... 165/276 |

* cited by examiner

Primary Examiner—Ljiljana Ciric

(57) ABSTRACT

A thermal control device for controlling the temperature of a craft/spacecraft is an electrostatic switch causing a large change in apparent emissivity. A flexible covering has a high emissivity and makes close contact with the surface of the spacecraft when electrostatically attracted thereto, when the covering is out of contact, the spacecraft surface emissivity controls radiation. The device can operate with moderate levels of DC voltages. Application of voltage results in high emissivity while removal of voltage allows a separator to move the covering out of contact and thus results in low emissivity.

14 Claims, 4 Drawing Sheets

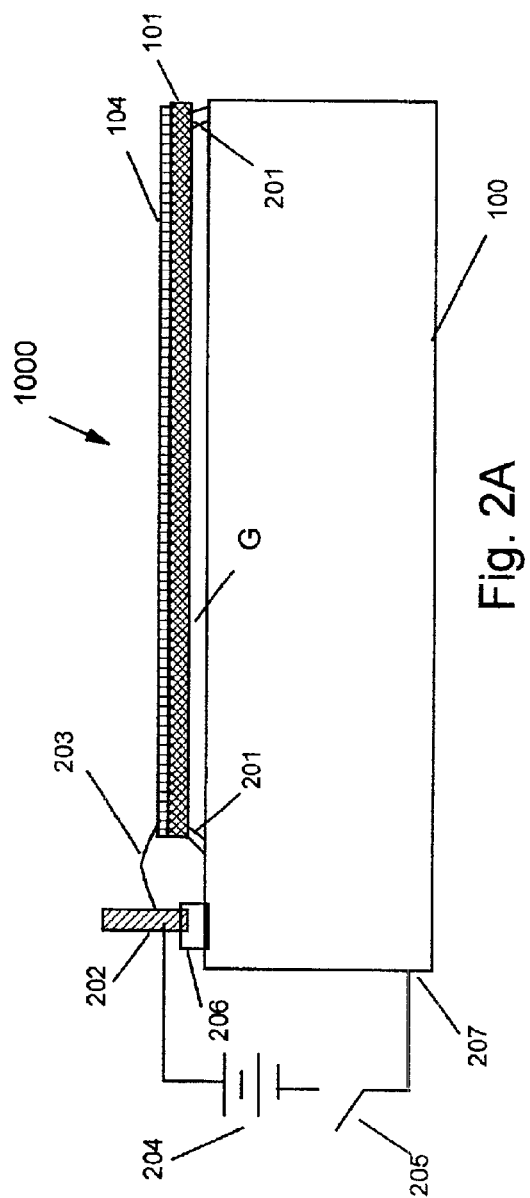
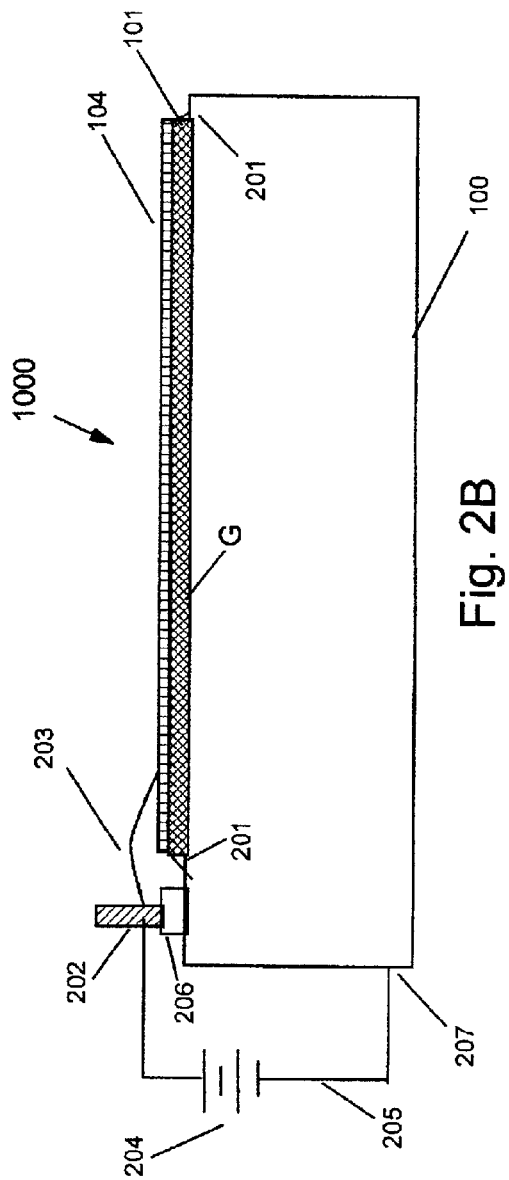

ELECTROSTATIC SWITCHED RADIATOR FOR SPACE BASED THERMAL CONTROL

FIELD OF THE INVENTION

The present invention relates to an improved device for controlling the effective emissivity of a surface by use of electrostatic attraction, which controls the thermal conductivity.

BACKGROUND OF THE INVENTION

Control of solar absorption and/or thermal emissivity is important for temperature control involving systems where radiation is the major heat control mechanism. Control of black body radiation and solar absorption, using spectrally selective coating, will help control the temperature. But, when the heat load varies, active control of the thermal radiation is needed. Coolants have been used to conduct heat to an external radiator and can be controlled to block, or to be open, to piping. Louvers are another alternative that can be used to open or close. With a louver in one position, the exposed surface will have a high emissivity; alternately when the louvers is in the other position, the exposed surface will have a lower emissivity and will radiate less heat. When radiators are fixed, as in present art, options including heat pipes, heat pump systems, capillary pump looped heat pipes and louvers can be effective but are expensive, heavy and bulky.

Electrostatic forces have been used previously in various applications.

U.S. Pat. No. 4,665,463 (1986) to Ward et al. describes an electrostatic chuck for holding a semiconductor wafer, comprising a dielectric layer on a supporting electrode. A potential is applied between the wafer and the electrode and the dielectric is loaded with thermally conductive material to improve dissipation of heat generated in the wafer during a processing treatment such as exposure to an electron beam.

U.S. Pat. No. 4,771,730 (1987) to Tezuka et al. describes a vacuum processing apparatus with a vacuum vessel within which a work to be processed is drawn and held fixed on a specimen table by an electrode functioning doubly as an electrostatic chuck, to which is connected a gas feeding pipe for feeding a gas affording good heat transmission between the mutually contacting surfaces of the work and the electrode to control the temperature of the work.

What is needed is a smaller, less expensive, flexible, lighter weight, higher performance, and more reliable solution. The present invention solves these problems with use of an electrostatic switched radiator.

SUMMARY OF THE INVENTION

The main aspect of the present invention is to provide an electrically switched radiator for space based thermal control by use of an electrostatic hold-down or release of a thin composite film to control inner compartment craft/spacecraft temperature.

Another aspect of the present invention is to provide thermal control by producing a large change in effective emissivity when switching the device from the "off" (non-radiating) to the "on" (radiating) stage.

Another aspect of the present invention is to provide a high emissivity composite film to control craft/spacecraft skin temperature.

Another aspect of the present invention is to provide a device for switching the effective emissivity from a low to a high value and visa versa via contact/non-contact with a surface to be cooled.

Another aspect of the present invention is to provide for a thin composite film which is flexible for good contact with the outer skin of the craft.

Another aspect of the present invention is to provide a low cost, low weight, high performance, high reliability and small size electrostatically controlled radiator for thermal control of craft/spacecraft temperatures.

Other aspects of this invention will appear from the following description and appended claims, reference being made to the accompanying drawings forming a part of this specification wherein like reference characters designate corresponding parts in the several views.

The present invention utilizes a high emissivity composite film to control craft/spacecraft skin temperature. The electrostatic hold-down switches the mode of heat transfer from the craft/spacecraft skin from a conduction mode to a radiation mode and back. The device is referred to as the "Electrostatic Switched Radiator" or ESR. The ESR is very lightweight and has demonstrated with experimentation the capability to switch the emissivity from below 0.1 to above 0.95. Emissivity is simply the ratio of the actual emitted radiance to that of an ideal blackbody. Emissivity ranges from 0 to 1 where 1 would be a blackbody. Emissivity can also vary with wavelength for any particular substance. For example, the emissivity for a water droplet decreases as the wavelength decreases.

The ESR construction is simple and lightweight. It consists of a thin polymer film, with a weight of less than a few hundred grams/m$^2$. The film can be anchored to the craft/spacecraft at the edges. The cover film consists of a high dielectric constant insulator with a good dielectric strength and is coated on its outer surface with an electrically conductive thin layer. The outer surface of the ESR is constructed to have a very high emissivity, ideally with low visible absorbance. This combination can be achieved with an appropriate paint or, for better performance, a multi-layer thin film designed for very low visible absorbance and high emissivity. The top surface or "skin" of the craft/spacecraft, to which the ESR will be "in contact" or "not in contact" should have a very low emissivity, i.e. sputtered gold.

Basic heat control is simple and highly effective. When the ESR is turned on, the emitting surface is in good thermal contact with an inner surface skin (such as the outer skin of a spacecraft). This results in good heat conduction between the craft surface (skin) and the ESR such that the emitting surface of the film is at the craft skin temperature. The emitting ESR surface radiates at the "skin" temperature (high emissivity state). When the ESR is turned off, the film moves away from the skin (is not in contact) and the heat flow is only radiation from the inner surface skin (low emissivity). Thus, once it reaches equilibrium, the film can only radiate the heat it absorbs which is limited to radiation from the inner surface skin. The inner surface skin is fabricated with a low emissivity and thus in the released state, the outer skin emissivity doesn't change, however it's temperature drops and the result is a drop in the radiated energy. This approach avoids the need for an infrared (IR) transparent conductor, which is always difficult since transparent conductors (wide band gap semiconductors with high electron concentration) have significant absorption in the IR.

The ESR requires minimal material requirements and the system is compatible with conventional paints and coatings for full utilization in low solar absorbance, high emissivity coatings. Typical films could consist of an outside coating of copper with only 1000 angstrom to 25–50 micron thickness. A sputtered metal on a polymer will improve hold-down via a more pliable structure and allow operation at a lower applied voltage. The film itself is an insulator such as polyimide (for example KAPTON brand polyimide) and requires a high dielectric constant, high thermal conductivity, and high dielectric strength properties. Other films such as KYNAR brand polymer film are also alternatives. The ESR operates as a high quality capacitor with a dielectric (film) between two layers of metal (film metallic coating and craft metallic coating). The surface area (radiating area) of the ESR is calculated to dissipate heat needed to control the internal temperature of the vehicle or craft. Surface area is selected as a function of heat generated in order to determine the amount of heat to be radiated. The ESR can be subdivided into sectional areas depending on design requirements. The skin or area of contact, such as the outer skin of a craft, is required to be metallic or metallic coated (typically aluminum). Typical internal craft temperatures are often controlled around 300 degrees Kelvin (Room Temperature). The heat generated inside will raise the internal temperature and the ESR will dissipate the heat to control the internal temperature to room temperature.

Switching a DC voltage controls the "on" versus the "off" state of the ESR. The ESR will operate effectively with moderate levels of DC voltage (typically 100–500 VDC). When voltage is applied between the outer conductive surface of the film and the outer conductive of the craft, the film is attracted to the craft surface and a high emissivity level results transferring heat. Experimentation has shown that the applied voltage can be lowered significantly before the film releases. Removal of the voltage results in physical separation and thus a low emissivity state. Experimentation has shown that physical separation by floating was acceptable. In the alternative, separation can be achieved with a release mechanism or separator. The coated film can be attached at all corners or simply at one edge. A piezoelectric strip attached to the cover film in which applying a voltage would cause them to expand, causing the entire structure to bend (bimorph). Other separators include nonconductive hinges, slight tension on the composite film at the edges so as to control "spring-back", a spring loaded or magnetically actuated plunger that simply moves the cover film out a small amount, etc.

Early experimentation by the inventor has shown individual ESR devices can be fabricated with measured emissivity changes of 0.74 or more. Additionally, it has been shown that ESR devices can be fabricated with achieved high value emissivity levels greater than 0.9 and low value emissivity levels of lower than 0.1. Thus devices with these characteristics would generate a change of greater than 0.8 in switched emissivity levels.

Actual test measurements of a working device contained within a vacuum bell jar were performed using a copper block with an area consisting of a flat black painted strip as the high emissivity reference, an area of bare copper as a low emissivity reference, and an area with the ESR. Measurements were taken using an INFRAMETICS 625 brand of imager, which is a camera sensitive from 8 to 14 microns. Test results showed that, within the limits of the test setup, the "on" state of the ESR was approximately the same as the black painted substrate and the "off" state of the ESR was approximately the same energy as the bare copper. The black painted area was estimated to have an emissivity of approximately 0.95 and the bare copper an emissivity of less than 0.01. Thus, within the limits of the experimental measurements, the high emissivity "on" state (with electrostatic hold-down) was shown to have the same emissivity as the black painted strip and the low emissivity "off" state (with no electrostatic hold-down) was shown to have the same emissivity as the bare copper. This test showed that electrostatic hold-down would insure good thermal contact and that a vacuum system could produce a sufficiently low pressure to eliminate or minimize thermal conduction from the air.

Since this measurement is sensitive to the wavelength of the detector, additional measurements were made in which measurements of the heat loss were used to determine the emissivity. With this measurement, the sample is placed on a thermal control plate and the heat loss is measured by measuring the power required to maintain temperature and is basically a calorimetric approach. The heat loss with ESR switching gives a very accurate measure of a change of emissivity. Absolute values of emissivity require a calibrated sample, which used a sputtered gold film as the "zero" emissivity point and a black paint for the high emissivity value ($\epsilon \sim 0.9$).

FIG. 3 (below) shows measured results for a sample consisting of a cover film with a thin aluminum film. For this measurement, the voltage was applied while the sample was warm and showed a change of the effective emissivity of 0.74. This test showed that electrostatic hold-down would insure good thermal contact.

BRIEF DESCRIPTION OF THE DRAWINGS

FIG. 2A is a cross-sectional view of the ESR with a voltage source and switch and the ESR in the "OFF" position.

FIG. 2B is a cross-sectional view of the ESR with a voltage source and switch and the ESR in the "ON" position.

Before explaining the disclosed embodiment of the present invention in detail, it is to be understood that the invention is not limited in its application to the details of the particular arrangement shown, since the invention is capable of other embodiments. Also, the terminology used herein is for the purpose of description and not of limitation.

DETAILED DESCRIPTION OF DRAWINGS

Figure 1B:
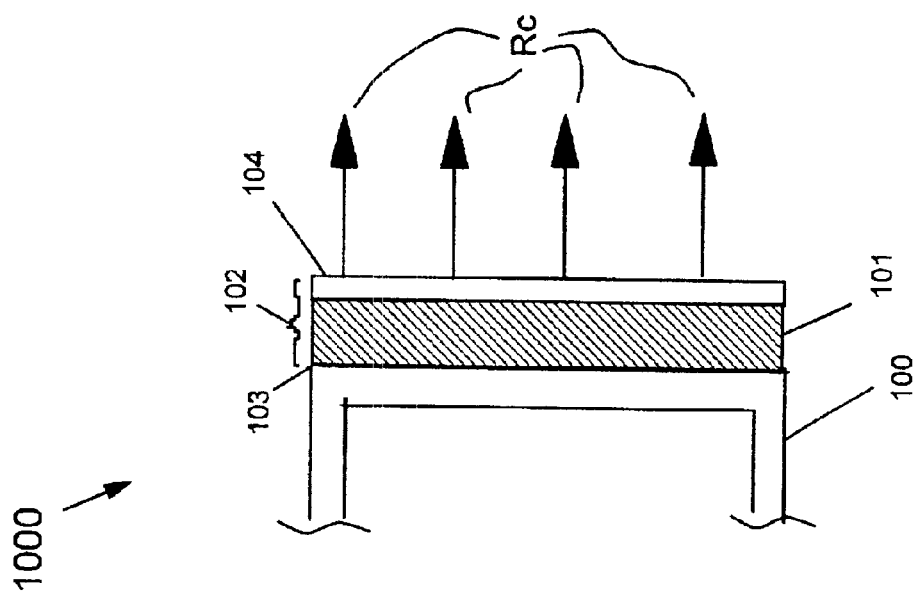
FIGS. 1A, 1B is a depiction of the ESR in the "OFF" and the "ON" states, respectively.
Figure 1A:
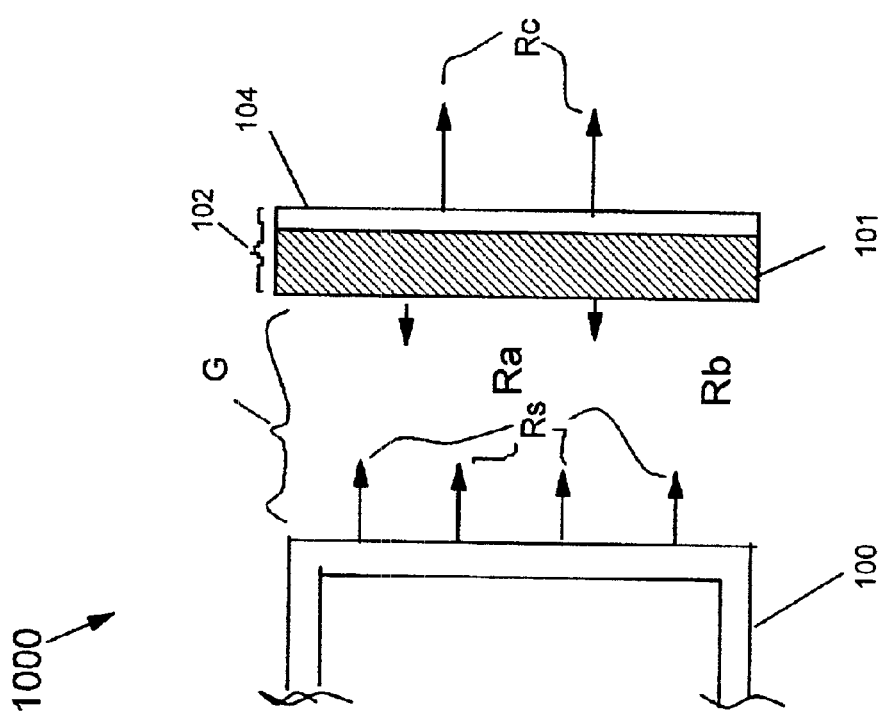

FIG. 1A is a depiction of the ESR 1000 in the "OFF" state. The outer skin 100 of a craft radiates heat via radiation Rs. Thermal gap G acts as an insulator. Energy is radiated Rs by the outer skin 100, which has a low surface emissivity. Heat is absorbed by the composite film 102 consisting of the dielectric 101 and the thin metallic surface coat 104. In this "OFF" position, the heat loss from the outer skin 100 is the energy lost from radiation emitted Rs minus the energy absorbed from the reflected radiated energy Ra of the composite film 102 (dielectric 101 and thin metallic surface coat 104) and minus the energy absorbed from the radiated energy Rb by the surface of the composite film 102 (dielectric 101 and metallic surface coat 104) at an unknown temperature. The composite film 102 (dielectric 101 and outer thin metallic surface coat 104) thus emits reflected radiated energy Ra back to the skin 100 and radiated energy Rb from the surface temperature. Energy is also transferred into space by radiated energy Rc from the high emissivity surface of metallic surface coating 104. A steady state temperature will occur when the temperature of the dielectric 101 and metallic surface coat 104 reaches a temperature such that it's energy absorbed is equal to its energy radiated.

FIG. 1B is a depiction of the ESR 1000 in the "ON" state. In this state, the outer skin 100 of a craft is in close contact 103 (thermal contact) with the thin film dielectric 101 and its metallic coating 102. In this "ON" state heat is conducted away from the outer skin 100 of the craft at a very high level of efficiency and transferred into space by radiation Rc off the metallic surface 104 which is designed at a high emissivity.

FIG. 2A is a cross-sectional view of the ESR 1000 with a voltage source 204 and switch 205 open and thus the ESR 1000 in the "OFF" position. The metallic surface coat 104 and thin film dielectric 101 are separated from the outer skin 100 of the craft by a thermal gap G. Non-conductive hinges 201 could be used to facilitate the separation, as could a piezoelectric strip. A DC circuit consists of a DC voltage source 204, a switch 205 in the open position, an outer skin contact point 207, a connector 202 and insulator 206 and a wire contact 203 to the metallic surface coat 104.

FIG. 2B is a cross-sectional view of the ESR 1000 with a voltage source 204 and switch 205 in the "ON" position. In this position the thermal gap G is basically zero. Thus, the metallic surface coat 104 and thin film dielectric 101 are in direct contact with the outer skin 100 of the craft. Various separators may be used to insure that this gap G is sufficient to limit the heat transfer. Separators can include non-conductive hinges 201 as shown, which are designed to collapse. Normal elasticity of the cover film when stretched and mounted at the ends may be sufficient to insure such a gap. A piezoelectric strip attached to the cover film as previously described could also be used. In this "ON" position the DC voltage source 204 pulls the thin film dielectric 101 and its metallic surface coat 104 into thermal contact with the outer skin 100. The ESR 1000 transfers heat from the outer skin 100 and radiates the heat into space by the high emissivity surface of the metallic surface coat 104. As also shown in FIG. 2A, is a DC circuit consisting of a DC voltage source 204, a switch 205 in the closed position, an outer skin contact point 207, a connector 202 and insulator 206 and a wire contact 203 to the metallic surface coat 104.

Figure 3:
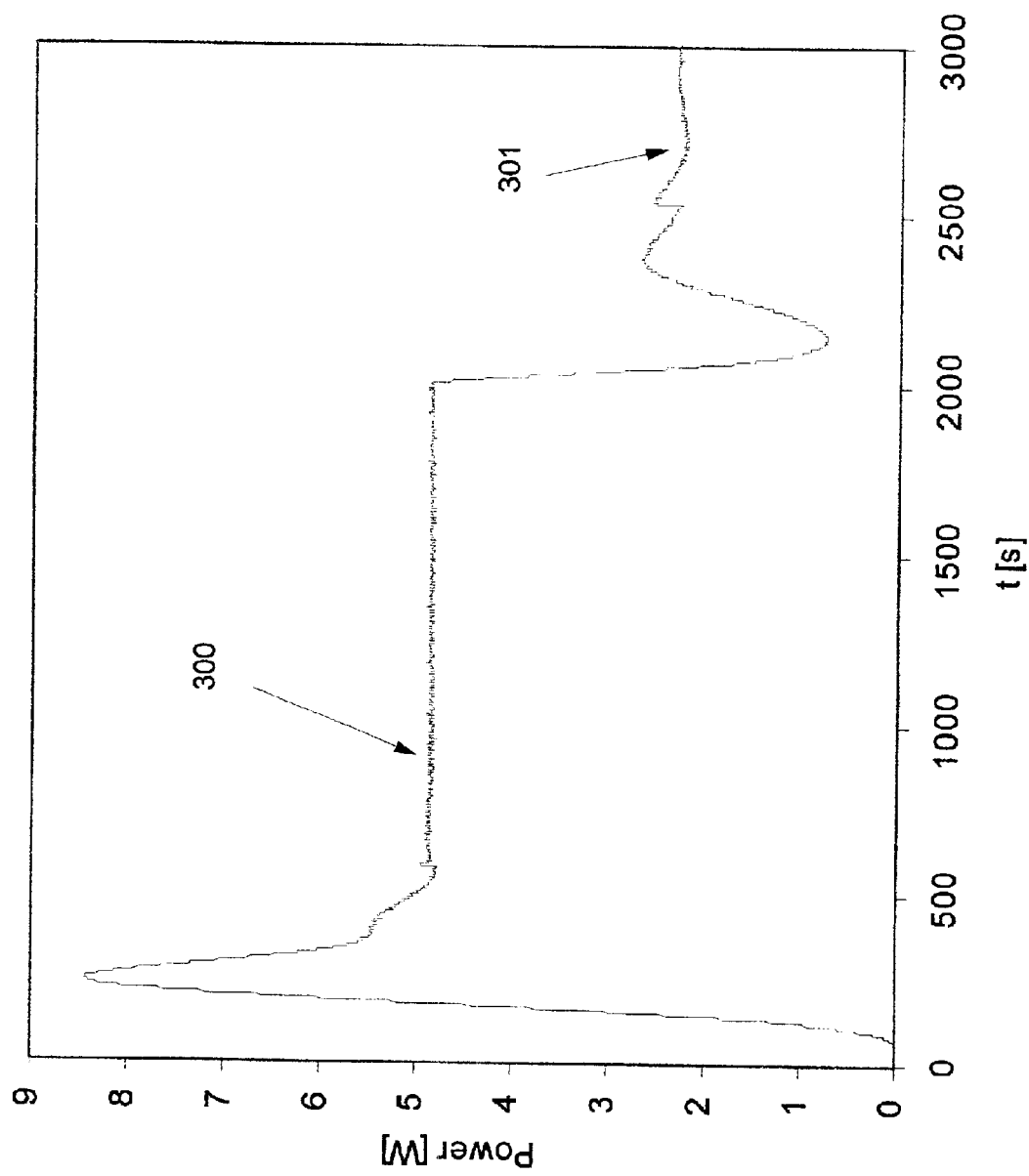
FIG. 3 is a graph of power input measurements of a thin metallized ESR.
Figure 4:
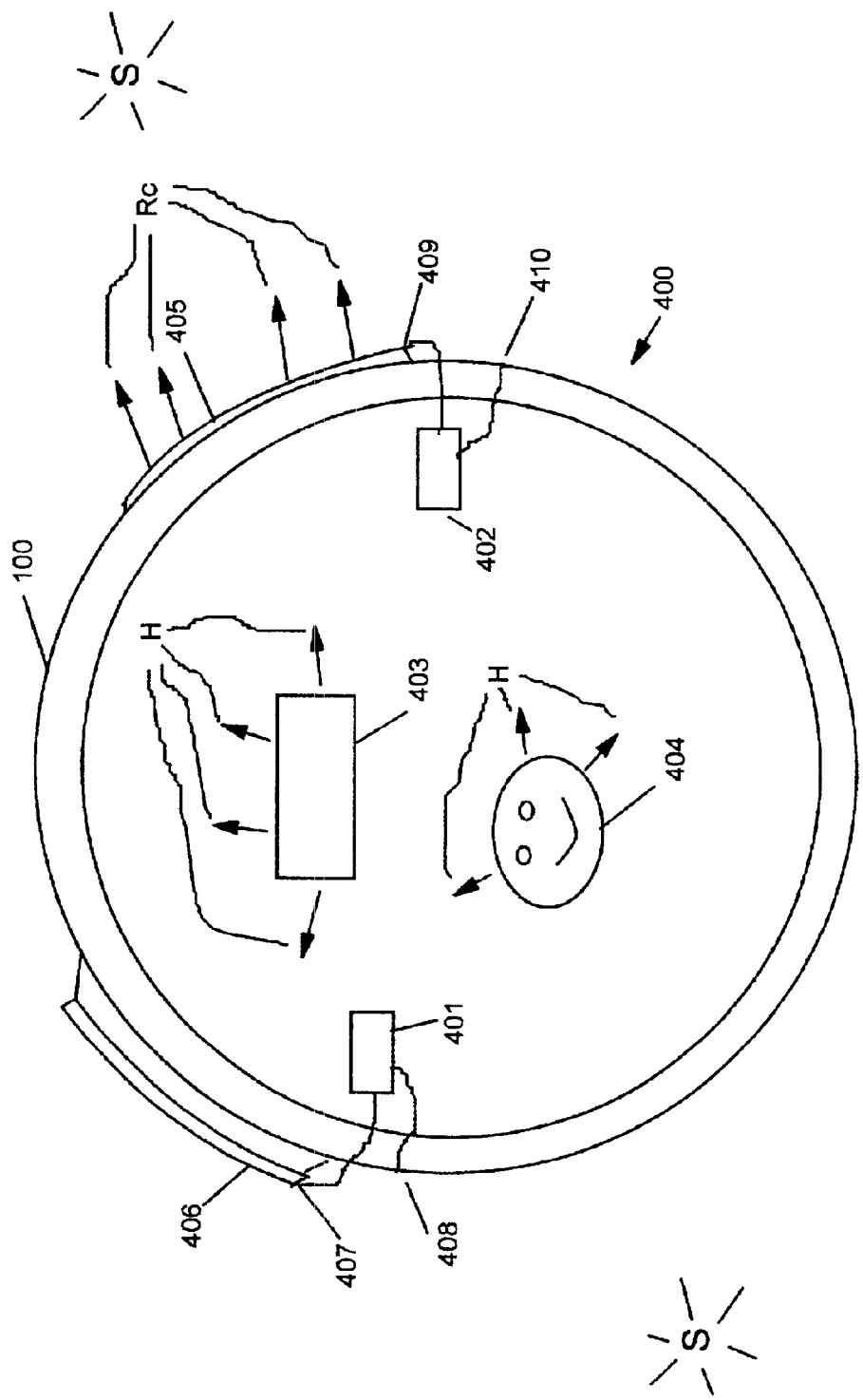
FIG. 4 is a depiction of a craft with two ESRs attached, one in the "ON" and one in the "OFF" position.

FIG. 3 is a graph of power input measurements of a thin metallized ESR as was discussed above; the sample tested having a change of emissivity of 0.74. When the ESR was switched from a low "off" state 300 to a high "on" state 301 it can be seen that power requirements decreased FIG. 4 is a depiction of a craft 400 with two ESRs attached, one in the "ON" position 405 and one in the "OFF" position 406. Energy released within a craft can come from electronics 403 and/or human occupants 404 which would increase the internal craft temperature if no control were present. Electronic switching sensors 401, 402 would allow for electrostatic switching of the ESRs 405, 406 by allowing a voltage to be "on" or "off". Contact points for the electronic sensor 401 are at the outer skin 408 and at the metallic surface 407 of the ESR 406, which is shown in the "OFF" or non-contact mode. Thus, little or no energy is radiated into space S as previously discussed. Contact points for the electronic sensor 402 are at the outer skin 410 and at the metallic surface 409 of the ESR 40S, which is shown in the "ON" or contact mode. Thus, energy Rc is radiated into space S as previously discussed.

Although the present invention has been described with reference to preferred embodiments, numerous modifications and variations can be made and still the result will come within the scope of the invention. No limitation with respect to the specific embodiments disclosed herein is intended or should be inferred.

We claim:

1. A radiator comprising:
   a space craft having an inside, and having a low emissivity layer, outer in reference to the inside of the space craft;
   a substantially flat, planar movable covering disposed substantially parallel to said outer layer and having a contact mode and a non-contact mode with the low emissivity outer layer;
   said movable covering further comprising a composite film with dielectric base layer, inner in reference to the inside of the space craft, and an outer high emissivity metallic coating on the outer side of the inner dielectric base;
   a switched power source having a first pole connected to the low emissivity outer layer and a second pole connected to the high emissivity metallic coating; and
   wherein a non-powered state of the outer high emissivity metallic coating causes the non-contact mode and a low heat transfer rate away from the space craft, and a powered state of the outer high emissivity metallic coating causes the contact mode and a high heat transfer rate away from the space craft.

2. The radiator of claim 1, wherein the movable covering is flexible.

3. The radiator of claim 2, wherein the space craft is located in space.

4. The radiator of claim 1, wherein the switched power source is DC.

5. A variable heat transfer surface, said surface comprising:
   a low emissivity layer covering at least a portion of a space craft having a heat-emitting inside, the layer outer in reference to the inside of the space craft;
   a substantially flat, planar movable covering disposed substantially parallel to said outer layer and having a contact mode and a non-contact mode with the low emissivity outer layer;
   said movable covering further comprising a composite film with dielectric base, inner in reference to the inside of the space craft and high emissivity metallic coating on the outer side of the inner dielectric base;
   a power source connected across the low emissivity outer layer and the high emissivity metallic coating;
   a switch to supply power "ON" and "OFF" across the low emissivity outer layer and the high emissivity metallic coating; and
   wherein the switch in the "OFF" position causes the non-contact mode and a resulting low heat transfer rate away from the surface, and the switch in the "ON" position causes the contact mode and a resulting high heat transfer rate away from the surface.

6. The variable heat transfer surface of claim 5, wherein the low emissivity outer layer further comprises at least a portion of a space craft, said space craft being usable in space.

7. The variable heat transfer surface of claim 6, wherein the movable covering is flexible.

8. The variable heat transfer surface of claim 5, wherein the movable covering is flexible.

9. The variable heat transfer surface of claim 5, wherein the power source is DC.

10. A radiator comprising:

a low emissivity layer covering at least a portion of a space craft, the layer outer in reference to the inside of the space craft;

a temperature control comprising a substantially flat, planar movable covering disposed substantially parallel to said outer layer and having a contact mode and a non-contact mode with the low emissivity outer layer, thereby enabling a higher amount of heat to radiate from the space craft in the contact mode relative to the non-contact mode.

11. The radiator of claim 10, wherein the movable covering further comprises a flexible composite film further comprising dielectric base, the base inner in reference to the inside of the space craft and high emissivity metallic coating covering a low emissivity layer, the coating outer in reference to the inside of the space craft.

12. The radiator of claim 11, wherein the movable covering further comprises a switched power source having a first pole connected to the low emissivity outer layer and a second pole connected to the high emissivity metallic coating of the temperature control.

13. The radiator of claim 12 further comprising a DC power source to drawing together the low emissivity outer layer and the temperature control via an electrostatic force.

14. A radiator comprising:

a low emissivity outer layer covering at least a portion of a space craft having a heat-emitting inside, the layer outer in reference to the inside of the space craft;

a temperature control further comprising a substantially flat, planar movable covering disposed substantially parallel to said outer layer and having a contact mode and a non-contact mode with the low emissivity outer layer, thereby enabling a higher amount of heat to radiate from the space craft in the contact mode relative to the non-contact mode;

wherein the movable covering further comprises a flexible composite film further comprising a dielectric base, the base inner in reference to the inside of the space craft and high emissivity metallic coating, the coating outer in reference to the inside of the space craft covering the low emissivity outer layer;

wherein the movable covering further comprises a switched power source having a first pole connected to the low emissivity outer layer and a second pole connected to the high emissivity metallic coating of the temperature control;

wherein the movable covering further comprises a switched power source having a first pole connected to the low emissivity outer layer and a second pole connected to the high emissivity metallic coating of the temperature control; and a DC power source functioning to draw together the low emissivity outer layer and the temperature control via an electrostatic force.

* * * * *